| (12) | United States Patent | (10) Patent No.: | US 11,200,173 B2 |
|---|---|---|---|
| | Alagumuthu | (45) Date of Patent: | Dec. 14, 2021 |

(54) CONTROLLING CACHE SIZE AND PRIORITY USING MACHINE LEARNING TECHNIQUES

(71) Applicant: PayPal, Inc., San Jose, CA (US)

(72) Inventor: Shanmugasundaram Alagumuthu, Milpitas, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/101,689

(22) Filed: Nov. 23, 2020

(65) Prior Publication Data

US 2021/0182203 A1 Jun. 17, 2021

Related U.S. Application Data

(63) Continuation of application No. 16/230,851, filed on Dec. 21, 2018, now Pat. No. 10,846,227.

(51) Int. Cl.
*G06F 12/0871* (2016.01)
*G06F 12/0891* (2016.01)
*G06N 20/00* (2019.01)

(52) U.S. Cl.
CPC ...... *G06F 12/0871* (2013.01); *G06F 12/0891* (2013.01); *G06N 20/00* (2019.01); *G06F 2212/6026* (2013.01)

(58) Field of Classification Search
CPC ..... H04L 67/2842; H04L 67/02; H04L 67/06; H04L 67/2838; H04L 65/4084
USPC ........................................................ 711/113
See application file for complete search history.

(56) References Cited

U.S. PATENT DOCUMENTS

| 7,085,891 | B2 | 8/2006 | Trevathan |
| 9,569,367 | B1 | 2/2017 | Wigmore et al. |
| 2003/0188106 | A1* | 10/2003 | Cohen ................. H04L 67/1095 |
| | | | 711/133 |
| 2004/0243642 | A1* | 12/2004 | Irudayaraj ............... G06F 16/25 |
| 2005/0010727 | A1* | 1/2005 | Cuomo ............... G06F 16/9574 |
| | | | 711/138 |
| 2006/0248124 | A1 | 11/2006 | Petev et al. |
| 2008/0294846 | A1 | 11/2008 | Bali et al. |
| 2009/0037660 | A1* | 2/2009 | Fairhurst ............... G06F 12/126 |
| | | | 711/129 |
| 2011/0258391 | A1 | 10/2011 | Atkisson et al. |
| 2011/0288847 | A1 | 11/2011 | Narayanan et al. |

(Continued)

OTHER PUBLICATIONS

Thodoris Lykouris, et al., "Better Caching with Machine Learned Advice," 2018 Copyright held by the owner/author(s), 3 pages.

(Continued)

*Primary Examiner* — Titus Wong
(74) *Attorney, Agent, or Firm* — Kowert, Hood, Munyon, Rankin & Goetzel, P.C.

(57) ABSTRACT

Techniques are disclosed relating to controlling cache size and priority of data stored in the cache using machine learning techniques. A software cache may store data for a plurality of different user accounts using one or more hardware storage elements. In some embodiments, a machine learning module generates, based on access patterns to the software cache, a control value that specifies a size of the cache and generates time-to-live values for entries in the cache. In some embodiments, the system evicts data based on the time-to-live values. The disclosed techniques may reduce cache access times and/or improve cache hit rate.

20 Claims, 6 Drawing Sheets

(56) References Cited

U.S. PATENT DOCUMENTS

| | | | |
|---|---|---|---|
| 2012/0284356 A1* | 11/2012 | Luna | G06F 16/9574 |
| | | | 709/213 |
| 2013/0073809 A1* | 3/2013 | Antani | G06F 12/121 |
| | | | 711/136 |
| 2014/0068196 A1* | 3/2014 | Benoit | G06F 12/0871 |
| | | | 711/135 |
| 2014/0344452 A1 | 11/2014 | Lipstone et al. | |
| 2016/0072910 A1 | 3/2016 | Eicher et al. | |

OTHER PUBLICATIONS

Using Machine Learning to Optimize Cache Resources, Jun. 14, 2016, http://www.undergraduatelibrary.org/system/files/UAReport.pdf, pp. 1-27.

Muralidharan Murugesan, et al., "Impact of Machine Learning Techniques with Cache Replacement Algorithmsinenhancingthe Performance of the Webserver," International Journals of Advanced Research in Computer Science and Software Engineering ISSN: 2277-128X (vol. 7, Issue-6), Jun. 2017, pp. 812-816.

International Search Report and Written Opinion in PCT Appl. No. PCT/US2019/066788 dated Mar. 5, 2020, 7 pages.

International Application No. PCT/US2019/066788, International Preliminary Report on Patentability dated Jul. 1, 2021, 6 pages.

\* cited by examiner

CONTROLLING CACHE SIZE AND PRIORITY USING MACHINE LEARNING TECHNIQUES

The present application is a continuation of U.S. application Ser. No. 16/230,851, filed Dec. 21, 2018 (now U.S. Pat. No. 10,846,227), the disclosure of which is incorporated by reference herein in its entirety.

BACKGROUND

Technical Field

This disclosure relates generally to caching technology and more specifically to using a machine learning engine to control the length of time data is stored in the cache and the size of the cache.

Description of the Related Art

Caches are used to store various data to improve access times. For example, software caches may be used to store accessed data from multiple databases in a single data structure to reduce access times for subsequent accesses. Typically, larger caches take longer to access relative to smaller caches. A smaller cache may have a lower hit rate than a larger cache, however, which can cause substantial delays while accessing data from the original source for misses.

Figure 1:
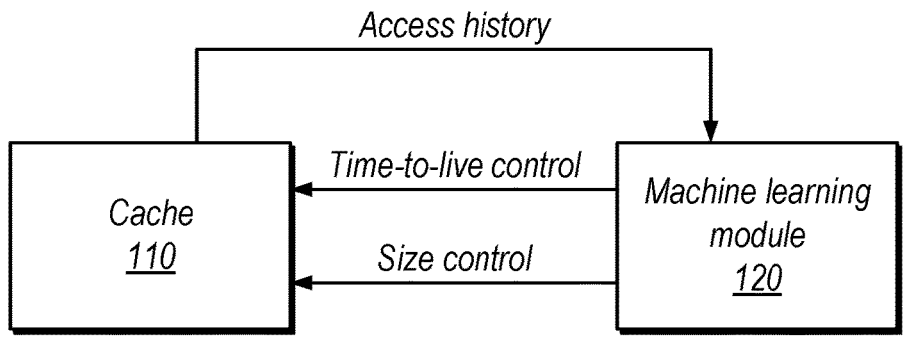
FIG. 1 is a block diagram illustrating example control of cache parameters by a machine learning module, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "machine learning module configured to generate time-to-live and size controls for a software cache" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for controlling a cache (which may be a software cache) using machine learning techniques. In some embodiments, a machine learning module controls cache size and priority of data stored in the cache. Priority may be reflected in eviction decisions or time-to-live values, for example. In disclosed techniques, the machine learning module generates control signals for cache size and priority based on an access history for the software cache.

In some embodiments, a training module trains the machine learning module based on one or more simulated read access times and a simulated hit rate for the software cache, where the simulated information is generated based on one or more outputs of the machine learning module. For example, in disclosed techniques, the machine learning module generates one or more time-to-live controls and a size control for the software cache and based on this information the training module generates simulated information for training the machine learning module.

Overview of Cache Control Using Machine Learning

FIG. 1 is a block diagram illustrating an example implementation of a cache controlled by a machine learning module, according to some embodiments. In the illustrated embodiment, machine learning module 120 communicates with cache 110. The machine learning module 120 may be trained using past access history as training data, as discussed below with reference to FIG. 2.

Machine learning module 120, in the illustrated embodiment, generates one or more time-to-live controls for information stored in the cache and a size control for the cache based on access history for cache 110. In some embodiments, machine learning module 120 generates and/or updates one or more of the two controls (as the access history changes, the controls are updated). Note that although time-to-live values are discussed herein for purposes of illustration, but the time-to-live values are not intended to limit the scope of the present disclosure; similar techniques may be used with any of various types of cache priority schemes, e.g., that determine when entries should be evicted and which entries should be evicted.

In some embodiments, machine learning module 120 implements one or more machine learning engines to generate time-to-live and size controls. For example, machine learning module 120 may implement one or more of the following: naïve Bayes, k means clustering, neural networks, random forests, decision trees, nearest neighbors, linear regression, support vector machine, etc.

Cache 110, in the illustrated embodiment, receives the time-to-live control and size control from machine learning module 120. In some embodiments, a control module changes the size of the cache based on the received size control. In some embodiments, the control module for cache 110 updates time-to-live values for one or more portions of information stored in cache 110 based on the time-to-live control received from the machine learning module 120. In some embodiments, cache 110 evicts one or more cache entries based on the time-to-live control.

In some embodiments, cache 110 is a software cache that is implemented using one or more hardware storage elements. In some embodiments, the size of the software cache may be dynamically modified during operation. In some embodiments, cache 110 stores data for one or more different user accounts. In some embodiments, the data stored for one or more different user accounts includes one or more of the following: user preferences (e.g., one or more settings entered by the user), activity level (e.g., frequency and the number of times the user account accesses information stored in the cache), location of user account (e.g., country where the account was generated), etc. Note that user account information is one example of information that may be stored in cache 110 and is included for purposes of illustration, but is not intended to limit the scope of cached information in other embodiments.

In some embodiments, access history includes timestamp information for each access to a given entry in the cache. In some embodiments, the timestamps also indicate a time when a given entry is cached. In some embodiments, the timestamps indicate one or more times a given entry in the cache was modified. A total number of reads from the cache performed by one or more applications accessing the information stored in the cache may be indicated by the access history. In some embodiments, access history indicates a total number of attempted writes to the cache by one or more applications. In some embodiments, the access history includes names, file identification (e.g., document key), sizes, etc. of one or more cache entries.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Training Module

Figure 2:
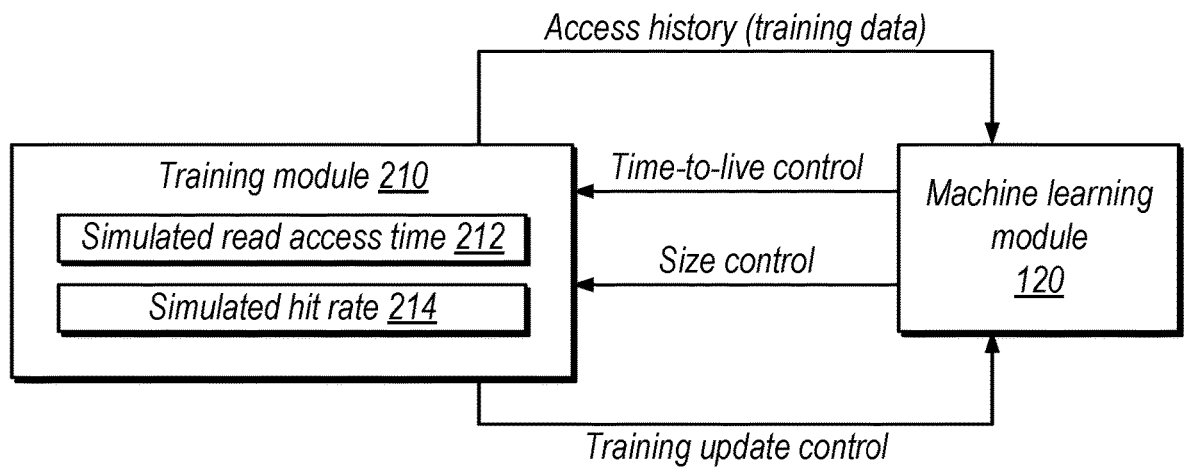
FIG. 2 is a diagram illustrating example training of a machine learning module using cache access history as training data, according to some embodiments.

FIG. 2 is a diagram illustrating example training of a machine learning module using cache access history as training data, according to some embodiments. In the illustrated embodiment, training module 210 trains machine learning module 120 based on simulated read access times 212 and a simulated hit rate 214.

Machine learning module 120, in the illustrated embodiment, generates one or more time-to-live controls for data stored in cache 110 and a size control for cache 110 based on its current configuration, which may be iteratively modified by training update controls from training module 210. In the illustrated embodiment, module 120 sends the controls to training module 210.

In the illustrated embodiment, based on the time-to-live and size controls, training module 210 generates simulated read access times 212 and a simulated hit rate 214. For example, training module 210 may use cache accesses that occurred subsequently to the access history input to machine learning module 120 to simulate how control decisions by module 120 would have affected access times and hit rate for those subsequent cache transactions.

In the illustrated embodiment, based on the simulated read access times 212 and simulated hit rate 214, training module 210 sends a training update control to machine learning module 120 (e.g., to modify the configuration of the machine learning module based on outputs of the machine learning module). This modification may include changing neural network weights, changing tree structures, etc., depending on the type of machine learning engine implemented.

In some embodiments, training may continue until a training threshold is reached. In some embodiments, the training threshold includes criteria specifying when to stop training the machine learning module. This may include, for example, threshold read access times and hit rates. As another example, the criteria may relate to whether improvements in read access times and hit rates are unlikely to improve more than a threshold amount with further training. If the simulated read access times and the simulated hit rates do not meet the training criteria, the training module 210 may continue to send updated training controls to the machine learning module 120. In some embodiments, training module 210 may train machine learning module 120 dynamically while it is operating to control cache 110.

Figure 3:
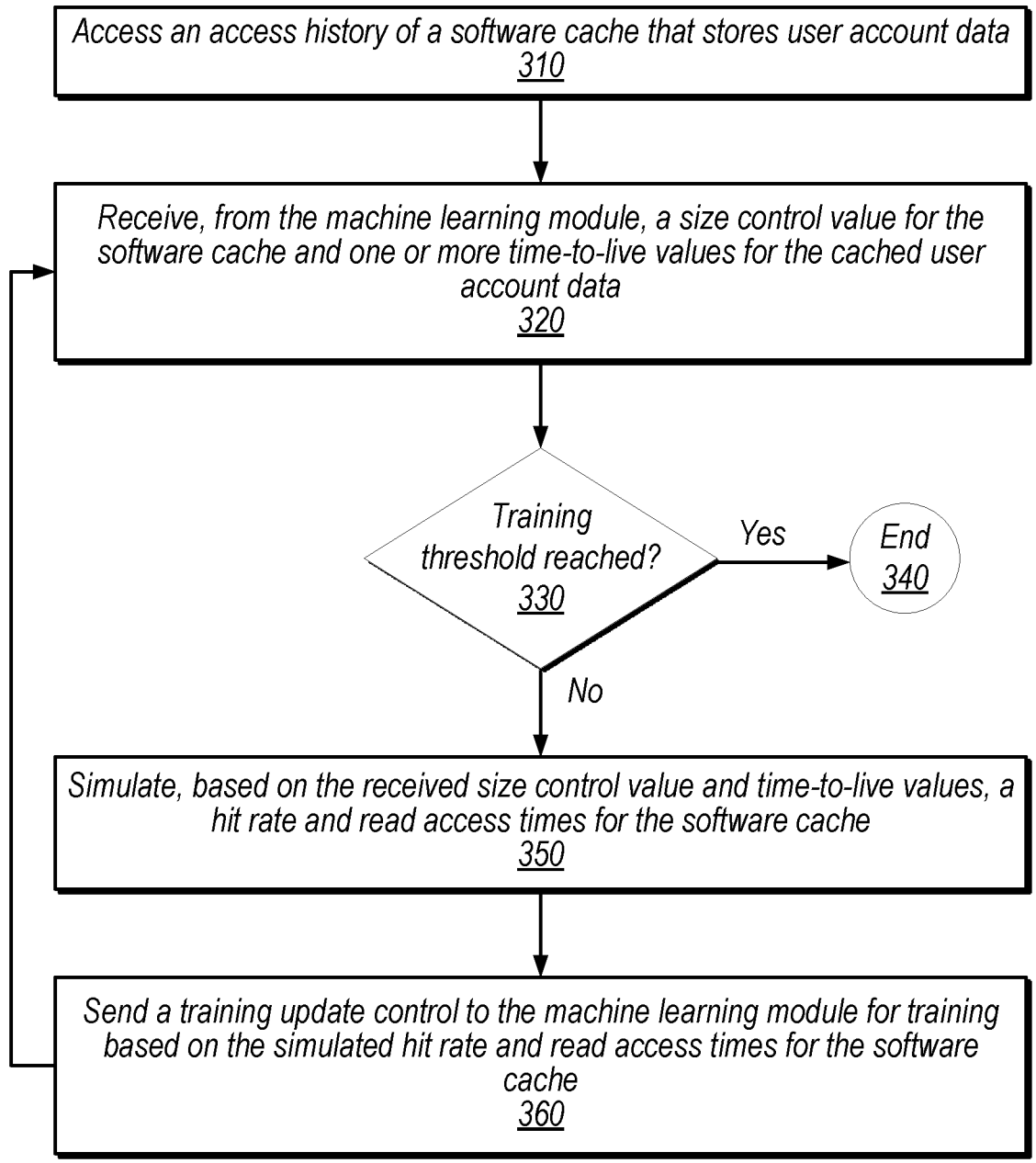
FIG. 3 is a flow diagram illustrating an example method for training a machine learning module to control a software cache, according to some embodiments.

FIG. 3 is a flow diagram illustrating an example method for training the machine learning module, according to some embodiments. At 310, in the illustrated embodiment, a training module accesses an access history of a software cache that stores user account data. In some embodiments, the access history of the software cache includes a number of accesses for one or more entries in the cache performed by one or more applications attempting to access user account data stored in the one or more entries.

At 320, in the illustrated embodiment, the training module receives, from the machine learning module, a size control value for the software cache and one or more time-to-live values for the cached user account data.

At 330, in the illustrated embodiment, the training module determines whether a training threshold has been reached. If the training threshold has been reached, in the illustrated embodiment, the flow continues to element 340 where the flow terminates. If, in the illustrated embodiment, the training threshold has not been reached, however, the flow continues to element 350, in the illustrated embodiment.

At 350, in the illustrated embodiment, the training module simulates a hit rate and read access times for the software cache based on the size control value and time-to-live values received from the machine learning module.

At 360, in the illustrated embodiment, the training module sends a training update control to the machine learning module for training based on the simulated hit rate and read access times for the software cache. In the illustrated embodiment, the flow returns from element 360 to element 320 to iteratively train the machine learning module until the training threshold is reached.

Example Techniques for Enforcing Cache Priority

Figure 4A:
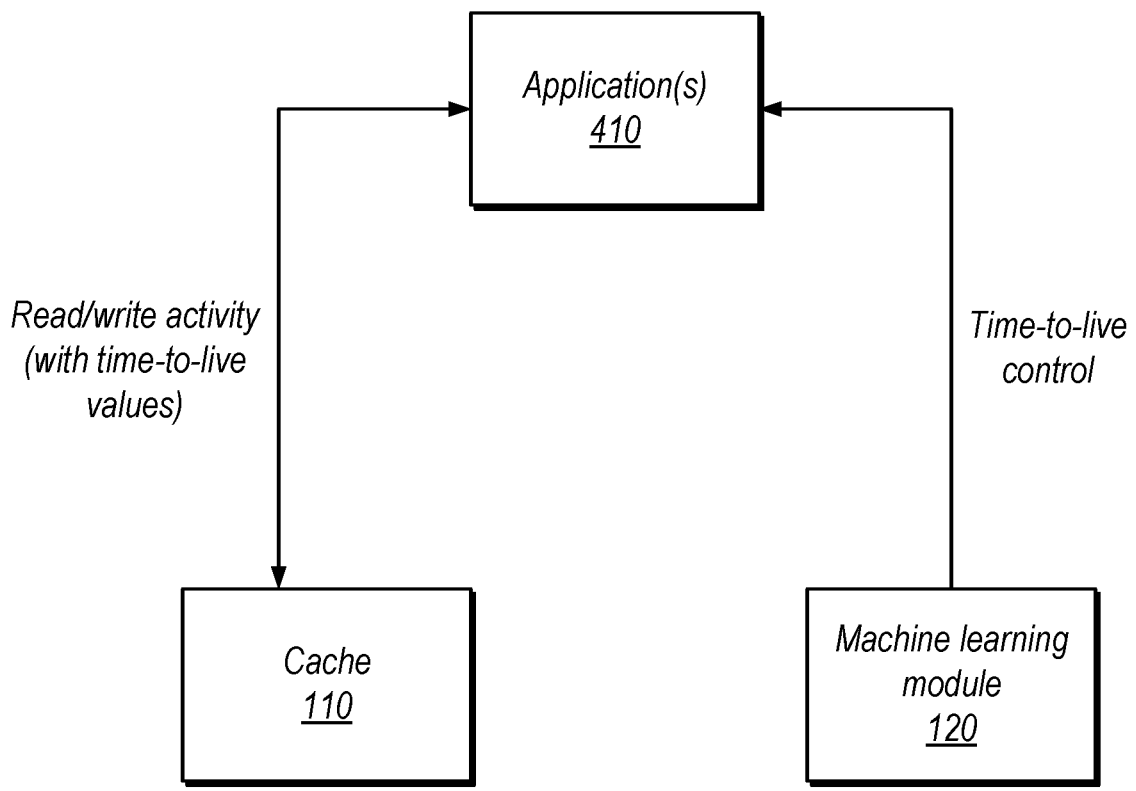
FIG. 4A is a block diagram illustrating example time-to-live values assigned through one or more applications, according to some embodiments.

FIG. 4A is a block diagram illustrating indirect control of cache entry priority, according to some embodiments. In FIG. 4A, application(s) 410 receive time-to-live values from machine learning module 120 and transmit the time-to-live values to cache 110. In some embodiments, cache 110 evicts stored data based on the assigned time-to-live values from application(s) 410. This is one example of an embodiments in which machine learning module 120 indirectly controls cache 110. Note that cache 110 may strictly implement the time-to-live values or may use them as hints (e.g., cache 110 may maintain entries as valid after their time-to-live has expired until they need to be evicted for incoming data). In some embodiments, the application(s) 410 may modify time-to-live values from machine learning module 120, e.g., based on internal knowledge of which data should be cached. Further, note that cache 110 may evict entries prior to their time-to-live expiration.

Figure 4B:
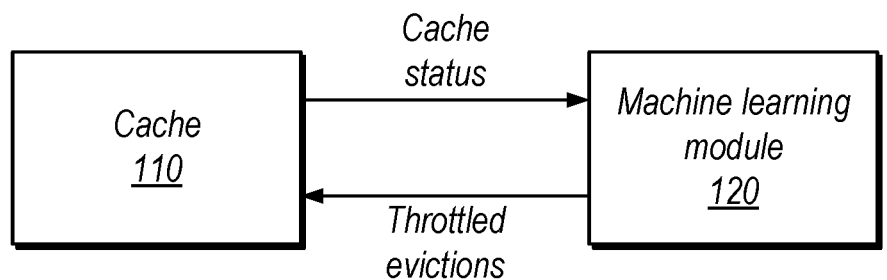
FIG. 4B is a block diagram illustrating example throttling of evictions for a software cache, according to some embodiments.

FIG. 4B is a block diagram illustrating example throttling of evictions for a software cache, according to some embodiments. In some embodiments, machine learning module 120 directly controls cache evictions, e.g., based on internal time-to-live values. In some embodiments, machine learning module 120 sends an eviction command to cache 110 when the time-to-live for an entry has expired. In the illustrated embodiment, machine learning module 120 throttles one or more evictions based on cache status information from the cache 110. For example, machine learning module 120 may wait to send one or more eviction commands when the cache 110 is above a threshold activity level, to avoid negative impacts to cache performance. In some embodiments, the cache status update includes one or more of the following: current activity levels (e.g., number of accesses per time period), total amount of data in cache, currently available storage in cache, number of accesses per time period, etc.

As discussed above, the disclosed techniques may be implemented using other priority techniques in addition to or in place of time-to-live values. For example, in some embodiments, machine learning module 120 may maintain an internal priority list of cache entries. In response to a need to evict one or more entries, machine learning module 120 may indicate to cache 110 which entries to evict based on the priority list. These techniques may be implemented without time to live values or in addition to using time to live values. As another example, machine learning module 120 may generate control information to modify least-recently-used information or any of various other formats of priority information in addition to or in place of time-to-live values.

Example Generation of Time-To-Live Values Based on Scoring Cache Entries

Figure 5:
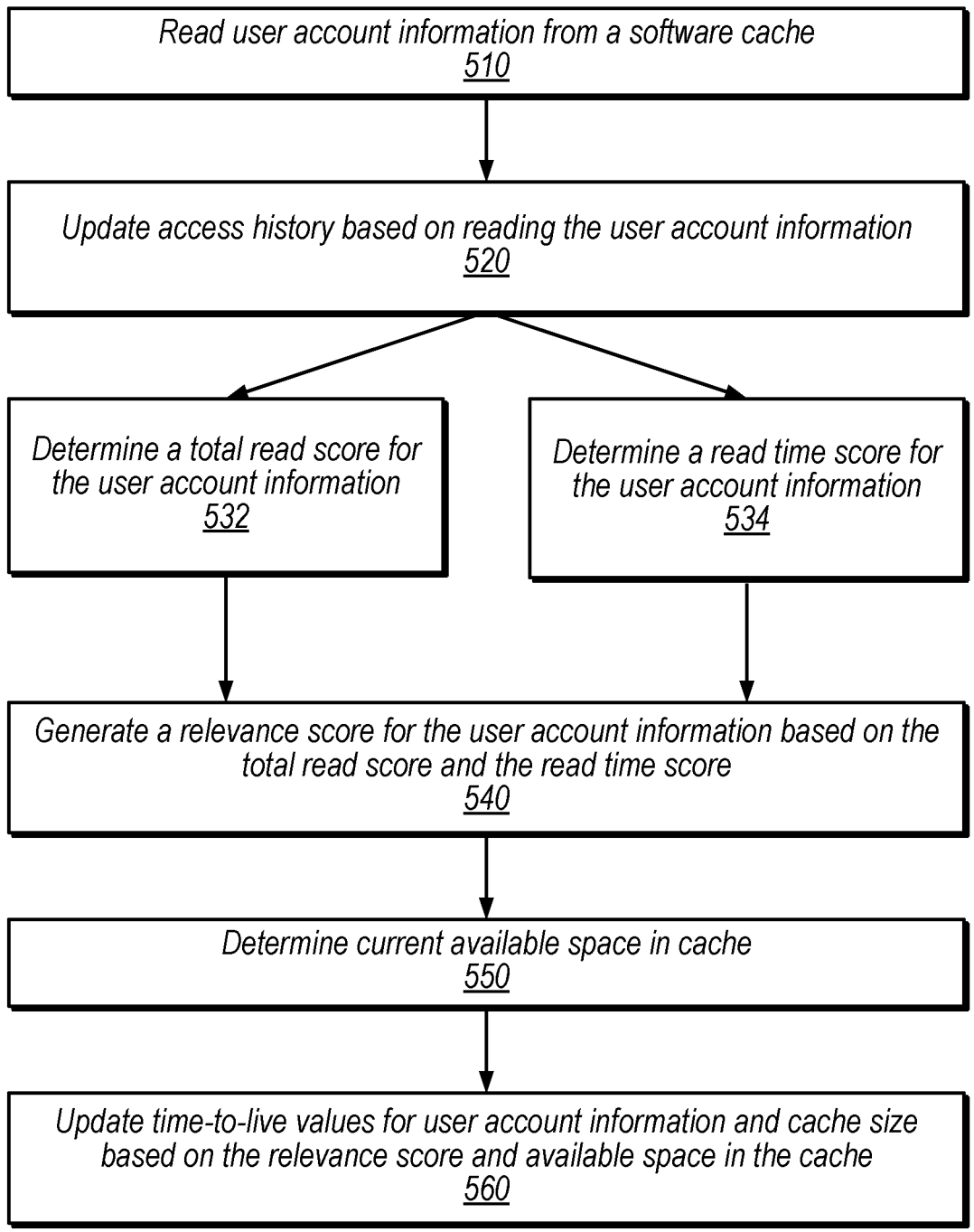
FIG. 5 is a flow diagram illustrating an example method for updating time-to-live values and cache size based on one or more determined relevance scores for one or more cache entries, according to some embodiments.

FIG. 5 is a flow diagram illustrating an example method for updating time-to-live values and cache size based on one or more determined relevance scores for one or more cache entries, according to some embodiments. In some embodiments, the method of FIG. 5 is implemented by machine learning module 120.

At 510, in the illustrated embodiment, one or more applications read user account information from a software cache. At 520, in the illustrated embodiment, the software cache updates access history for the user account information based on the one or more applications reading the account information.

At 532, in the illustrated embodiment, a machine learning module determines a total read score for the user account information. In some embodiments, the total read score is determined based on the total number of times a given cache entry is accessed in the cache. For example, if a user account document that is stored in the cache is read two times, the total read score is two. In another example, the total read time score may be determined based on both the total number of accesses and the total amount of data being accessed.

At 534, in the illustrated embodiment, the machine learning module determines a read time score for the user account information. In some embodiments, the read time score is determined based on the amount of time between the previous access and the current access (e.g., the access that occurred before the data read of element 510). For example, the read time score may decrease as the length of the interval increases. In various embodiments, time-based scores may be generated based on the number of accesses within certain intervals, detected patterns of accesses, etc. In pattern-detection embodiments, a short time-to-live value may be generated even when there are multiple recent accesses, e.g., based on recognizing a pattern that has a large upcoming gap between accesses.

At 540, in the illustrated embodiment, the machine learning module generates a relevance score for the user account information based on the total read score and the read time score. In some embodiments, the machine learning module may adjust how the relevance score is determined based on the total read score and read time scores during training, e.g., by altering algorithms or weights used to incorporate those scores into the relevance score. Similarly, the machine learning module may adjust how various initial scores such as the total read score and the read time score are generated based on feedback during training.

At 550, in the illustrated embodiment, the machine learning module accesses the cache to determine the total amount of space currently available in the cache (e.g., the difference between space allocated for the current cache size and the space actually being used). At 560, in the illustrated embodiment, the machine learning module updates time-to-live values for user account information and the cache size based on the relevance score and the determined available space in the cache.

Example Method

Figure 6:
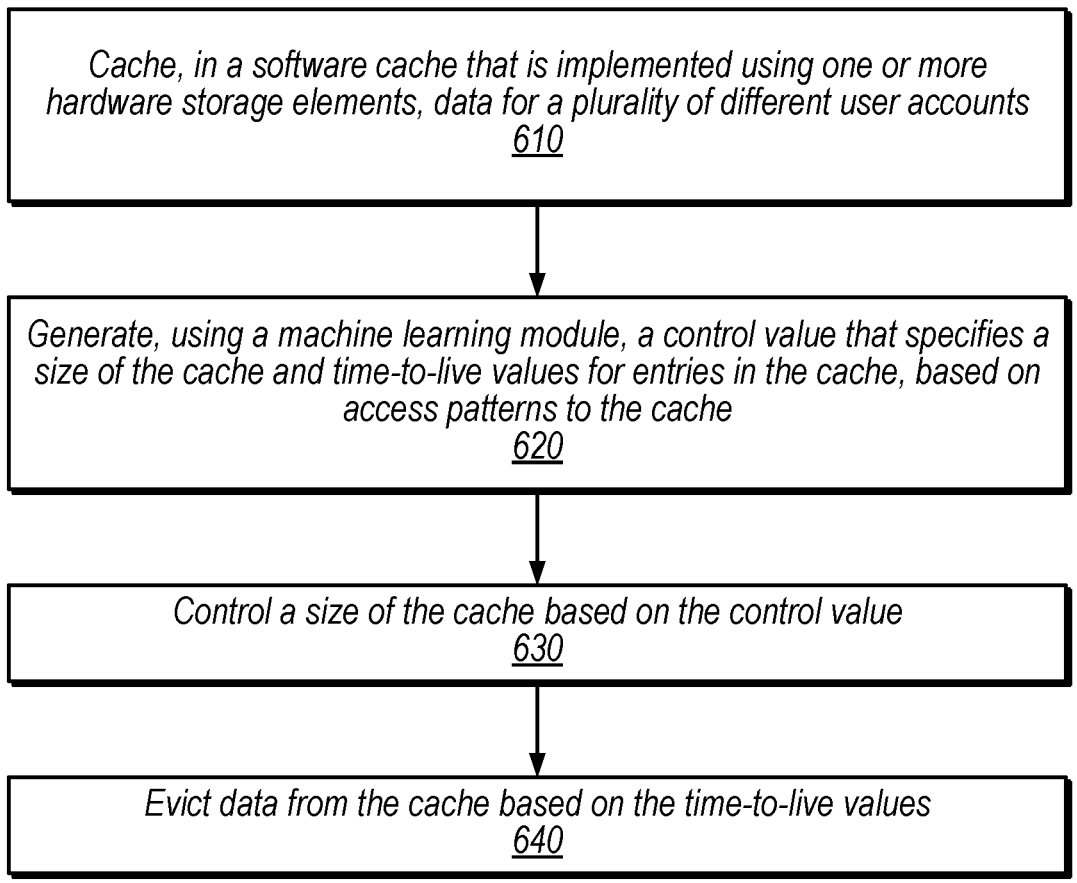
FIG. 6 is a flow diagram illustrating example method for controlling cache size and priority using machine learning techniques, according to some embodiments.

FIG. 6 is a flow diagram illustrating example method for controlling cache size and priority using machine learning techniques, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a software cache that is implemented using one or more hardware storage elements caches data for a plurality of different user accounts.

At 620, in the illustrated embodiment, a machine learning module generates a control value that specifies a size of the cache and generates time-to-live values for entries in the cache, based on access patterns to the cache. In some embodiments, a training module trains the machine learning module based on access patterns to the cache by a subset of the user accounts and based on feedback information that includes: a simulated hit rate for the cache for the subset of user accounts, and simulated read access times for the cache for the subset of user accounts.

At 630, in the illustrated embodiment, a computing system controls the size of the cache based on the control value. This may be performed by the cache module itself, by the machine learning module, or by some other module.

At 640, in the illustrated embodiment, the computing system evicts data based on the time-to-live values. In some embodiments, the computing system throttles one or more evictions corresponding to one or more time-to-live values based on an activity level of the cache.

In some embodiments, the machine learning module sends the time-to-live values to one or more applications that use the cache and the one or more applications include the time-to-live values when transmitting data to be cached. In some embodiments, one or more inputs to the machine learning module include time intervals between consecutive cache accesses for the same user account.

In some embodiments, the machine learning module considers accesses associated with a given account within a time interval. In some embodiments, the machine learning module weights ones of the accesses based on their location in the time interval and generates time-to-live values based on the weights. In some embodiments, the machine learning module detects patterns in access history for one or more accounts and generates the time-to-live values based on the detected patterns. In some embodiments, the machine learning module generates weights for accesses to the cache for one or more user accounts based on a time of day, day of the week, month, etc. the accesses occur.

Example Computing Device

Figure 7:
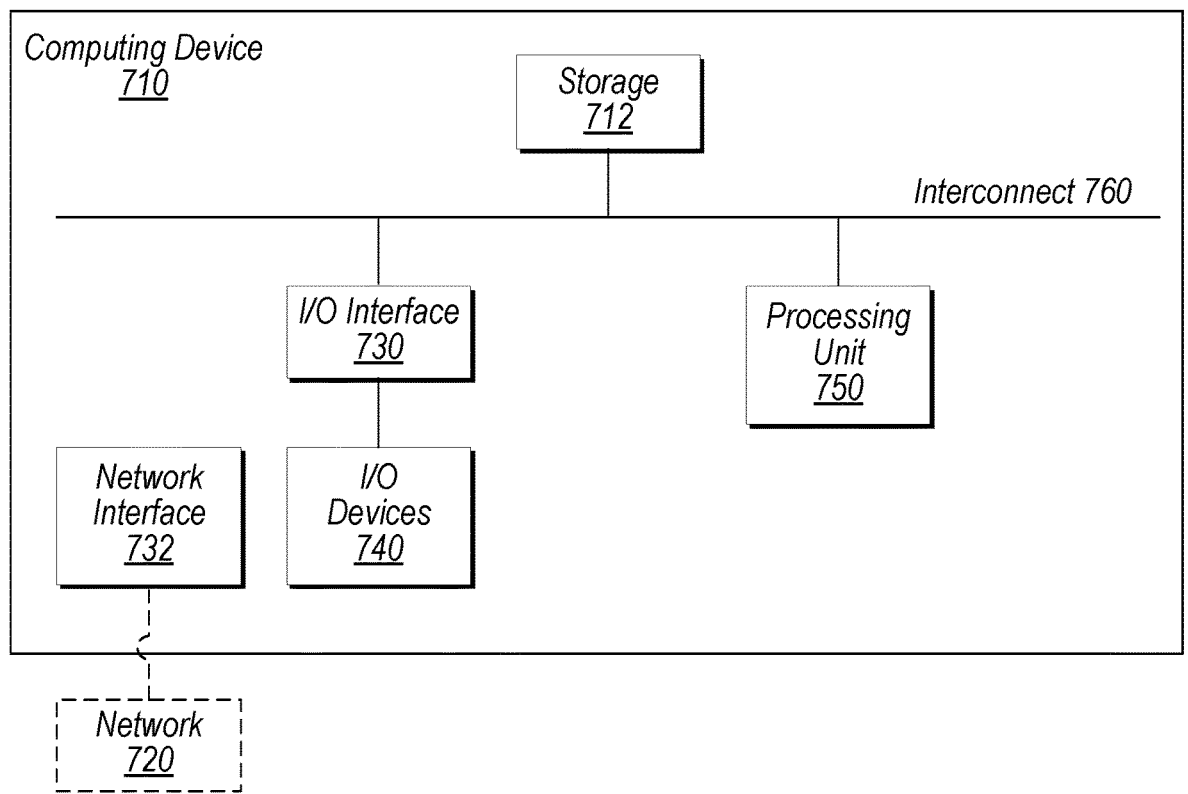
FIG. 7 is a block diagram illustrating an example computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An system for controlling cache size, comprising:
   a non-transitory memory; and
   one or more hardware processors coupled to the non-transitory memory and configured to read instructions from the non-transitory memory to cause the system to perform operations comprising:
     reading user account information from a software cache;
     updating, based on the reading of the user account information, access history of the software cache associated with the user account information;
     determining a total read score for the user account information and a read time score for the user account information;
     generating a relevance score for the user account information based on the total read score and the read time score;
     determining an amount of space available in the software cache; and
     updating time-to-live values for the user account information and a size of the software cache based on the relevance score and the amount of space available in the software cache.

2. The system of claim 1, wherein the total read score is determined based on at least one of a total number of times a cache entry is accessed in the software cache or a total amount of data being accessed.

3. The system of claim 1, wherein the read time score is determined based on an amount of time between a previous access and a current access of a cache entry from the software cache.

4. The system of claim 3, wherein the read time score decreases as the amount of time between the previous access and the current access of the cache entry increases.

5. The system of claim 1, wherein the read time score is determined based on at least one of a number of accesses within a set of intervals or a detected pattern of accesses.

6. The system of claim 1, wherein the relevance score is generated by a machine learning module that adjusts the relevance score based on the total read score and the read time scores during a training.

7. The system of claim 1, wherein the amount of space available in the software cache is determined based on a difference between a space allocated for a current software cache size and a space used of the current software cache size.

8. A method for controlling cache size, comprising:
   reading user account information from a software cache;
   updating, based on the reading of the user account information, access history of the software cache associated with the user account information;
   determining a total read score for the user account information and a read time score for the user account information;
   generating a relevance score for the user account information based on the total read score and the read time score;
   determining an amount of space available in the software cache; and
   updating time-to-live values for the user account information and a size of the software cache based on the relevance score and the amount of space available in the software cache.

9. The method of claim 8, wherein the total read score is determined based on at least one of a total number of times a cache entry is accessed in the software cache or a total amount of data being accessed.

10. The method of claim 8, wherein the read time score is determined based on an amount of time between a previous access and a current access of a cache entry from the software cache.

11. The method of claim 10, wherein the read time score decreases as the amount of time between the previous access and the current access of the cache entry increases.

12. The method of claim 8, wherein the read time score is determined based on at least one of a number of accesses within a set of intervals or a detected pattern of accesses.

13. The method of claim 8, wherein the relevance score is generated by a machine learning module that adjusts the relevance score based on the total read score and the read time scores during a training.

14. The method of claim 8, wherein the amount of space available in the software cache is determined based on a difference between a space allocated for a current software cache size and a space used of the current software cache size.

15. A non-transitory computer-readable medium having instructions stored thereon that are executable by a computing system to perform operations comprising:
   reading user account information from a software cache;
   updating, based on the reading of the user account information, access history of the software cache associated with the user account information;
   determining a total read score for the user account information and a read time score for the user account information;
   generating a relevance score for the user account information based on the total read score and the read time score;
   determining an amount of space available in the software cache; and updating time-to-live values for the user account information and a size of the software cache based on the relevance score and the amount of space available in the software cache.

16. The non-transitory computer-readable medium of claim 15, wherein the total read score is determined based on at least one of a total number of times a cache entry is accessed in the software cache or a total amount of data being accessed.

17. The non-transitory computer-readable medium of claim 15, wherein the read time score is determined based on an amount of time between a previous access and a current access of a cache entry from the software cache, and wherein the read time score decreases as the amount of time between the previous access and the current access of the cache entry increases.

18. The non-transitory computer-readable medium of claim 15, wherein the read time score is determined based on at least one of a number of accesses within a set of intervals or a detected pattern of accesses.

19. The non-transitory computer-readable medium of claim 15, wherein the relevance score is generated by a machine learning module that adjusts the relevance score based on the total read score and the read time scores during a training.

20. The non-transitory computer-readable medium of claim 15, wherein the amount of space available in the software cache is determined based on a difference between a space allocated for a current software cache size and a space used of the current software cache size.

* * * * *